May 26, 1970 R. M. ROBERTS 3,513,735
TOOL HOLDING CLAMP
Filed Aug. 5, 1968 2 Sheets-Sheet 1
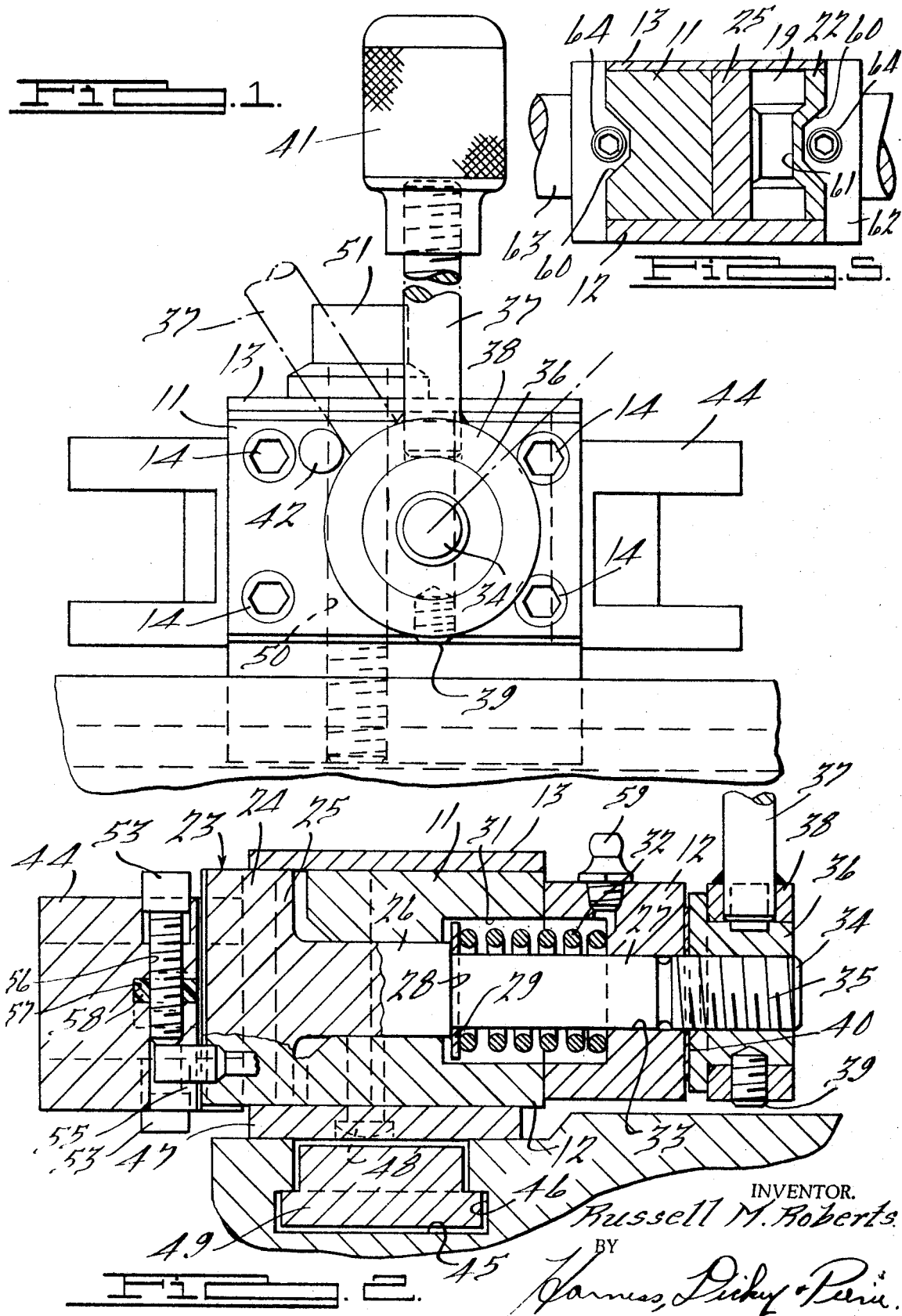
INVENTOR.
Russell M. Roberts
BY
Harness, Dickey & Pierce
ATTORNEYS

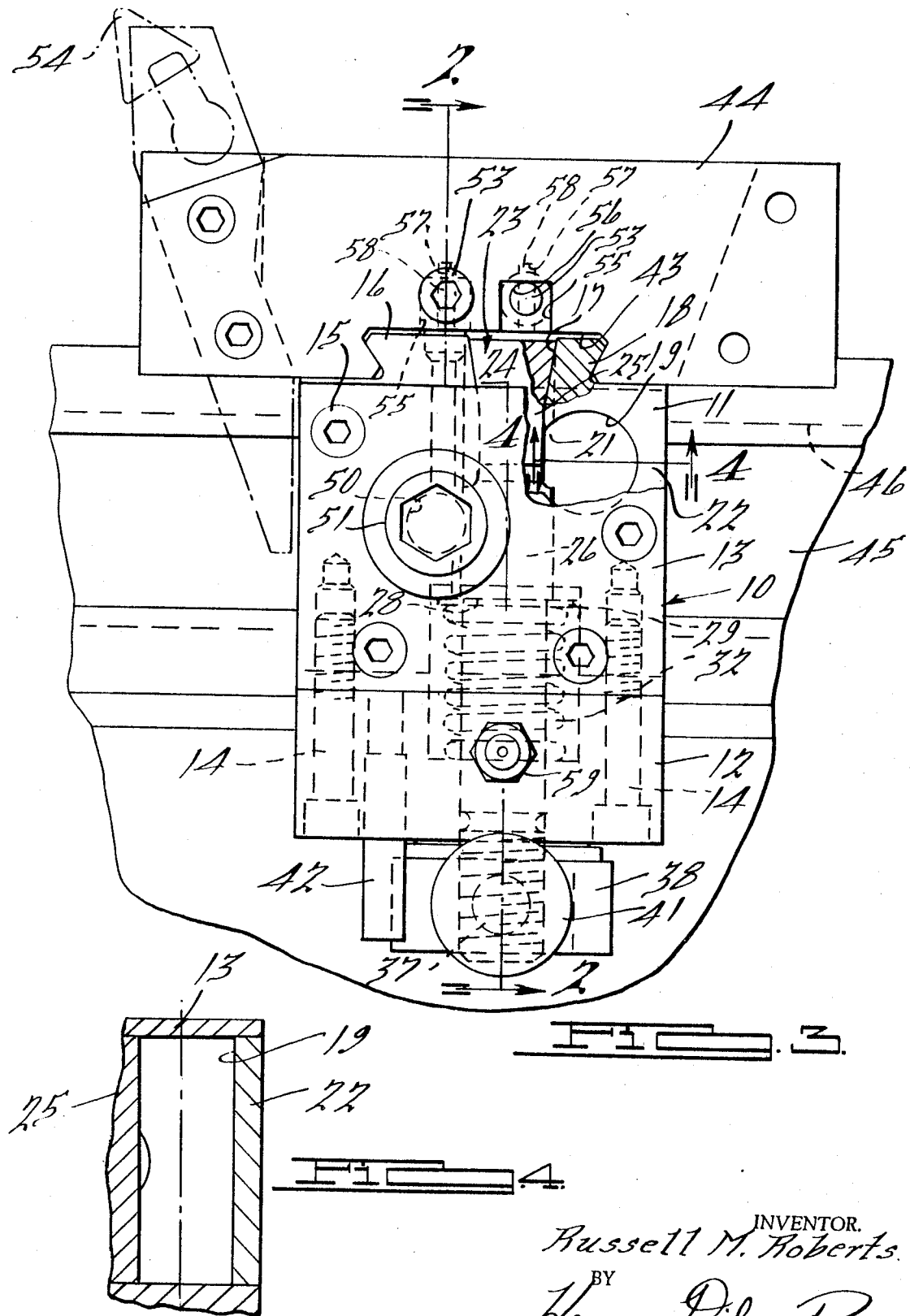

3,513,735
TOOL HOLDING CLAMP
Russell M. Roberts, 30030 W. 8 Mile Road,
Farmington, Mich. 48024
Filed Aug. 5, 1968, Ser. No. 750,077
Int. Cl. B23b 29/00
U.S. Cl. 82—36                    10 Claims

ABSTRACT OF THE DISCLOSURE

A clamp for a tool supporting block has a dovetail way which engages a dovetail slot in the wall of the block. The dovetail way is instantaneously released by the release of a wedge through the rotation of a nut on a small portion of a thread lead. The wall of the dovetailed body on one side of the wedge has an aperture provided therethrough to weaken the wall structure so that the one portion of the dovetail way will be deflected away from the other portion thereof when the wedge is moved downwardly in a tapered slot between the two portions to produce an instantaneously locking effect through the rotation of of the nut through a small angle.

BACKGROUND OF THE INVENTION

Reference may be had to the patent to Miller No. 3,107,562; that to Lynn No. 2,908,194 and that to Nix No. 3,311,005 for a disclosure of pertinent art.

SUMMARY OF THE INVENTION

The tools for cutting machines are made flexible by employing different types of tool holders for performing different operations on the same or different workpieces which are quickly changed and accurately located. The clamp of the present invention may be mounted on a crosshead, bed or other tool support of a machine in position to have the tool holders clamped thereon by a dovetail way which accurately positions the tool holders and the tools mounted thereon. The dovetail way is slotted parallel to the overhanging edges adjacent to the one which is to be deflected. This is a V-slot in which a wedge is disposed having a body with a threaded end engaged by a nut which controls the release or clamping of the wedge within the slot. A body of the clamp adjacent to the deflectable portion on the dovetail way has an aperture disposed therethrough communicating with one side of the V-slot for weakening the wall adjacent to one edge of the dovetail way the aperture being parallel to the edge. This arrangement eliminates the separate dovetail element usually employed in the art. A spring is provided about the threaded extension of the wedge for retracting the wedge when the nut is turned to release the wedge and the dovetail way.

BRIEF DESCRIPTION OF THE DRAWINGS

FIG. 1 is a broken plan view in elevation of the clamp of the present invention with a tool supporting block secured thereon;

FIG. 2 is a sectional view of a structure illustrated in FIG. 3, taken on the line 2—2 thereof;

FIG. 3 is a broken plan view of the structure illustrated in FIG. 1;

FIG. 4 is a broken sectional view of the structure illustrated in FIG. 3, taken on the line 4—4 thereof; and FIG. 5 is a sectional view of structure, similar to that of FIG. 4 showing another form of the invention.

DESCRIPTION OF THE PREFERRED EMBODIMENTS

A clamp 10 of the present invention has a body 11, a rear cover 12 and a top cover 13 retained in position by screws 14 and 15, respectively. Projecting forwardly of the body 11 is dovetail way 16 having a tapered slot 17 therein offset from the centerline of the body to have a portion 18 of reduced width. An aperture 19 is provided in the body below the portion 18 which cuts into the slot 17 at 21. The portion 18 is supported in cantilever from the edge of a body 22 located between the right-hand side of the aperture 19 and the adjacent side of the body 11. A wedge 23 has an upward taper portion 24, a rectangular portion 25 and an extending stud 26.

A reduced portion 27 of the stud forms a shoulder 28 against which a washer 29 abuts when the portion 27 extends through an aperture therein. The washer is slidably disposed in an aperture 31 in the body 11 and the rear cover 12 and a spring 32 is positioned between the bottom of the aperture and the washer. The reduced body portion 27 extends through an aperture 33 in the rear cover 12 and an extending end 34 contains a thread 35. A nut 36 is screwed upon the thread 35 against an antifriction washer 40 in engagement with the rear face of the rear cover 12 against which it applies the clamping force. A handle 37 has a ring 38 mounted on the end which is secured about the nut 36 by a set screw 39. The handle 37 has a knob 41 on the outer end by which it is moved from closed locked position illustrated in FIG. 1 as a dot dash line to an open position limited by a pin 42.

The movement of the handle 37 approximately 45° from unlocked position to lock position draws the stud 26 toward the handle thereby pulling the wedge portion 24 inwardly. This moves the overhanging edge 18 outwardly with the body portion above the aperture 19 which deflects from the body portion 22 located outwardly of the aperture 19. A very slight downward movement of the wedge section 24 produces sufficient outward movement on the overhanging edge 18 to have both edges of the dovetail way securely engage the opposite walls of a dovetail slot 43 in a tool holding block 44 to be supported by the clamp. Upon movement of the handle 37 in the opposite direction to abut against the pin 42, the stud 26 and wedge portion 24 thereof are moved outwardly in the slot 17 by the action of the spring 32. This immediately releases the tool holding block 44 which may then be removed.

The clamp may be secured in any manner to a support but is herein illustrated secured to a slide 45 having a T-head slot 46. For this particular adaptation, a riser 47 is secured to the bottom of the body 11 by a plurality of screws 48. A T-headed nut 49 has a bolt 51 extending through an aperture 50 through the cover plate 13, the body 11 and the riser 47 for drawing the nut upwardly in the T-head slot 46 to thereby firmly secure the clamp to the slide.

When it is necessary to accurately position a tool holding block 44 on the clamp, a pin 52 projects forwardly from the face of the dovetail way 16 to the left of the center thereof in position to be engaged by an adjusting screw 53 carried by the block 44. Oftentime it is desired to reverse the block to employ a tool such as a tool 54 illustrated in FIG. 3 and another tool which is supported on the opposite end of the block. By turning the block through 180° the second tool will be moved into the cutting position occupied by the first tool.

It will be noted in FIG. 3 that each side of the centerline of the block contains a recess 55 extending from the top and bottom faces of the block 44 for receiving the pin 52 from either position of the block. A threaded aperture 56 in alignment with the recesses 55 support the screws 53 for engagement with the pin 52. Centrally of the aperture 56 a recess 57 is provided for receiving a pin 58 of soft material such as nylon, which has the thread of the aperture 56 cut therethrough. The threads on the pin 58 provide friction to prevent the screw 53 from vibrating out of adjustment. By adjusting the screw upwardly or downwardly when contacting the pin 52, the block 44 will be lowered or raised to the desired position. When the tool on the opposite end of the block is to be employed, the block may be turned end-for-end and the other screw 53 will engage the pin 52 for adjusting the position of the block 44. When accurate location of the block is not required, the screw 53 is backed off out of engagement with the pin 52.

The clamp is sealed against the entrance of dirt or particles and is lubricated through a fitting 59 which prevents the entrance of dirt and grime and which can flush any collection thereof from the operating parts. The clamp is exceedingly accurate and requires only a slight movement of the handle to move it to clamped and unclamped positions. The integral relationship of the split dovetail way, providing greater rigidity, reduces the chance of vibration on heavy cuts and provides extreme accuracy. This permits the same machine dial readings to be employed when working on identical pieces and using several tool holders in the process. The wedge and the handle for producing its movement are the only movable parts and because of the slight movement of the wedge from locked to unlock position and to locked position, the life of the clamp is substantially indefinite.

In the embodiment illustrated in FIG. 5, the body 11 has recesses 60 on opposite sides and the aperture 19 has a central section 61 of smaller diameter to clear the adjacent recess 60 so as to maintain the wall portion 22 of substantially the same thickness. This type of aperture and the recesses 60 are used when a block 62 is one which supports a boring bar 63 having clamping screws 64 aligned with the recesses. The boring bar may be adjusted by loosening and tightening the screws 63 with an allen wrench operating in the recesses without the necessity of removing the block 62 from the clamp 10.

I claim:

1. In a clamp, a body, a dovetail way on the forward end of the body, said way having a V-slot disposed off center of the way to divide the way into a wide portion and a narrow portion, said body having an aperture therethrough beneath the narrow way portion and parallel thereto which cuts into said V-slot to have the narrow way portion overhang the aperture, and a wedge in said slot for moving said narrow way portion away from the wide way portion.

2. In a clamp as recited in claim 1, wherein said wedge has a stud thereon with a threaded end extending from the rear of the body, and a nut on said thread for moving said wedge.

3. In a clamp as recited in claim 2, wherein the nut has an operating handle thereon which moves the nut approximately ⅛ of a thread turn from unclamped to clamped position.

4. In a clamp as recited in claim 3, wherein a pin extends from the rear of the body in the path of movement of the nut handle to limit the movement of the nut to unclamped position.

5. In a clamp as recited in claim 1, wherein said stud has a shoulder thereon, an element having an aperture therethrough engaging said shoulder, and a spring within the body engaging said element for moving the wedge to unclamped position.

6. In a clamp as recited in claim 5, wherein a lubricating fitting on the body communicates with the interior thereof for admitting a lubricant to said stud and wedge.

7. In a clamp as recited in claim 1, wherein a pin projects forwardly of the wide portion of the dovetail way on one side of the centerline of the body, a tool supporting block having a dovetail slot, and a screw on said block inwardly of the bottom of the dovetail slot and offset from the centerline in position to engage said pin and adjust the block relative thereto.

8. In a clamp as recited in claim 7, wherein a second screw is provided on the block on the opposite side of the centerline and on the opposite side of the block.

9. In a clamp as recited in claim 8, wherein said block has recesses in the opposite faces into which the ends of the screws extend and which receives said pin from opposite sides of the block when the block is turned end-for-end through 180°.

10. In a clamp as recited in claim 1, wherein said aperture is of smaller diameter at the central portion and said body has a longitudinal recess in each of the opposite side faces.

References Cited

FOREIGN PATENTS 280,906   5/1952   Switzerland.

LEONIDAS VLACHOS, Primary Examiner

U.S. Cl. X.R.

29—96